United States Patent [19]

Bedu et al.

[11] Patent Number: 4,984,847
[45] Date of Patent: Jan. 15, 1991

[54] MOVABLE ARM REST WITH MOTORISED ADJUSTMENT

[75] Inventors: Guy Bedu, Nogent-Sur-Vernisson; Jean-Pierre Chabanne, Montargis, both of France

[73] Assignee: Tubauto, Levallois-Perret, France

[21] Appl. No.: 362,109

[22] Filed: Jun. 6, 1989

[30] Foreign Application Priority Data

Jun. 6, 1988 [FR] France .................................. 8807876

[51] Int. Cl.$^5$ ................................................ A47C 7/54
[52] U.S. Cl. .................................... 297/411; 297/115; 297/417
[58] Field of Search ............... 297/411, 417, DIG. 10, 297/113, 115, 346; 248/420, 395, 393

[56] References Cited

U.S. PATENT DOCUMENTS

| | | | |
|---|---|---|---|
| 792,127 | 6/1905 | Hallgren | 297/417 X |
| 1,191,269 | 7/1916 | Balser | 297/346 |
| 2,611,420 | 9/1952 | Diehl | 297/346 |
| 2,954,071 | 9/1960 | Morrison et al. | 248/420 X |
| 3,168,346 | 2/1965 | Rei, Jr. | 297/417 X |
| 3,663,319 | 5/1972 | Moloney, Jr. | 297/417 |
| 4,385,743 | 5/1983 | Werner | 248/393 |

*Primary Examiner*—José V. Chen
*Attorney, Agent, or Firm*—Oblon, Spivak, McClelland, Maier & Neustadt

[57] ABSTRACT

A movable arm rest, the position of which is adjustable by a motor, and which can be used in particular between the two front seats of a motor vehicle.

The arm rest comprises a movable component (1), the upper upholstered part (2) of which serves as a support for the user. By virtue of a motor which is fixed with respect to a support plate (5) disposed at the base of the movable component, the arm rest is displaced along inclined guide ramps which are fixed with respect to a fixed frame (4). The drive is provided by way of pinions (16) meshing with racks (47).

13 Claims, 5 Drawing Sheets

MOVABLE ARM REST WITH MOTORISED ADJUSTMENT

BACKGROUND OF THE INVENTION

The movable arm rest which is the subject-matter of the present invention concerns many types of seats and in particular vehicle seats. It can be installed in particular between the two front seats of a motor vehicle.

Fold-up arm rests have long been known, which, as required by the users, can be disposed in a position of use or in contrast pivoted away in such a manner as not to constitute an obstacle to movement therepast or to impede using all the available space.

Arm rests of that kind do not include means for adjusting the position thereof, in dependence, for example on the size of the users. Thus a fold-up or possibly manually adjustable arm rest is generally not placed between the front seats of a vehicle as it can cause problems for the driver.

Research was carried on into the possibility of providing an arm rest which can be adapted to any type of seat and which permits the user to adjust it in dependence on his needs in a quick and precise manner, without effort and without distracting his attention, if appropriate, from driving a vehicle of any type.

Finally research was carried on into the possibility of providing a motorised control which is both precise, robust and silent, and which does not run the risk of being damaged by exceptional forces applied to the arm rest either in the course of operation of the motor or when the motor is stopped.

SUMMARY OF THE INVENTION

The movable arm rest which is adjustable by a motor drive, being the subject-matter of this invention, makes it possible to achieve those results.

The arm rest comprises a movable component, the upper part of which is disposed laterally with respect to at least one seat, in such a way that the occupant of said seat can bear on said upper part, after having adjusted the position thereof, by means of a motor-driven control, in an adjustment range which is between a down position and an up position.

According to the invention the movable component comprises in its upper part a support plate provided with support means cooperating with guide means which are inclined with respect to the horizontal and which are fixed with respect to a fixed frame, so as to permit continuous displacement of said movable component from the down position to the up position or vice-versa. A motor which is fixed with respect to the support plate and provided with control means actuated by the occupant of at least one seat permits at least one toothed pinion which meshes with a toothed sector or a corresponding fixed rack to be driven in rotation in one direction or the other.

The support plate is preferably provided with four support means distributed along the side edges of the support plate, one at each end of two parallel axes of which one is disposed at one end of the plate and the other at the other end and which are parallel to said side edges; each of said support means co-operates with a corresponding guide means comprising a guide ramp which is fixed with respect to one or other of the two side walls of a fixed frame. The two side walls which each comprise two guide ramps are advantageously substantially vertical, flat, parallel to each other, disposed on respective sides of the support plate in parallel relationship with the side edges and substantially parallel to the direction towards which at least one seat corresponding to said arm rest is oriented.

The guide ramps may be straight or curved. Advantageously, each of the two side walls comprises at least one guide ramp which is substantially straight and the inclination of which with respect to the horizontal is between 20° and 80° and preferably between 30° and 70° and which is parallel to at least one rack with which meshes a toothed pinion which is driven by the motor which is fixed with respect to the support plate.

Advantageously, corresponding to each of said two substantially straight guide ramps is a rack which is disposed in the immediate vicinity thereof.

Advantageously also, each of the two side walls of the fixed frame comprises at least one curved guide ramp. The guide ramps may for example be produced by being cut out in the metal plate forming the side walls, the edges of said ramps being covered with a sliding lining of a plastics material such as a polyamide.

Preferably the motor which is fixed with respect to the support plate comprises a reducing unit driving a shaft which is perpendicular to the side walls of the fixed frame, each of the two ends thereof driving a pinion which meshes with a corresponding toothed sector or rack, a support means which is coaxial with said pinion co-operating with a guide ramp disposed in the immediate vicinity of said toothed sector or rack.

Advantageously the pinions and racks or toothed sectors as well as the support means are made of a plastics material such as a polyamide. Advantageously also the plastics material may be reinforced for example by textile fibres, glass fibres, carbon fibres or the like. It may also comprise a filler for enhancing slidability such as molybdenum disulphide. The plastics materials used for the guide ramps may also comprise such fillers or reinforcing agents.

In a particularly advantageous construction, each of the two side walls of a fixed frame is provided with a straight guide ramp and a curved guide ramp so that the four support means for a support plate which co-operate with said guide ramps impart to the support plate a variation in the angle of inclination with respect to the horizontal as they move along said ramps.

In a particularly advantageous configuration the arm rest according to the invention is disposed between the two front seats of a vehicle. In such a use, the guide ramps are given the inclination and, if necessary, at least two thereof are given the curved configuration, which are required in order that in the down position the arm rest disappears as completely as possible between the two seats while on the other hand, in the up position, the upper part of the arm rest which is in most cases upholstered is in the required position, in dependence on the selected height to which the arm rest is adjusted and the size of the user in order for the latter to have the required lateral support.

Advantageously the movable component of the arm rest, below the upper part which may or may not be upholstered, comprises a tidy bin, the bottom of which, being disposed on the support plate, is fixed with respect thereto by suitable connecting means.

The arm rest according to the invention may be made in many different alternative forms in regard both to the materials used and in regard to structural details. Those alternative configurations do not fall outside the area covered by the invention.

BRIEF DESCRIPTION OF THE DRAWINGS

The following Example and the accompanying drawings non-limitatively illustrate a particular embodiment of the arm rest according to the invention.

DETAILED DESCRIPTION OF THE PREFERRED EMBODIMENTS

Figure 1:
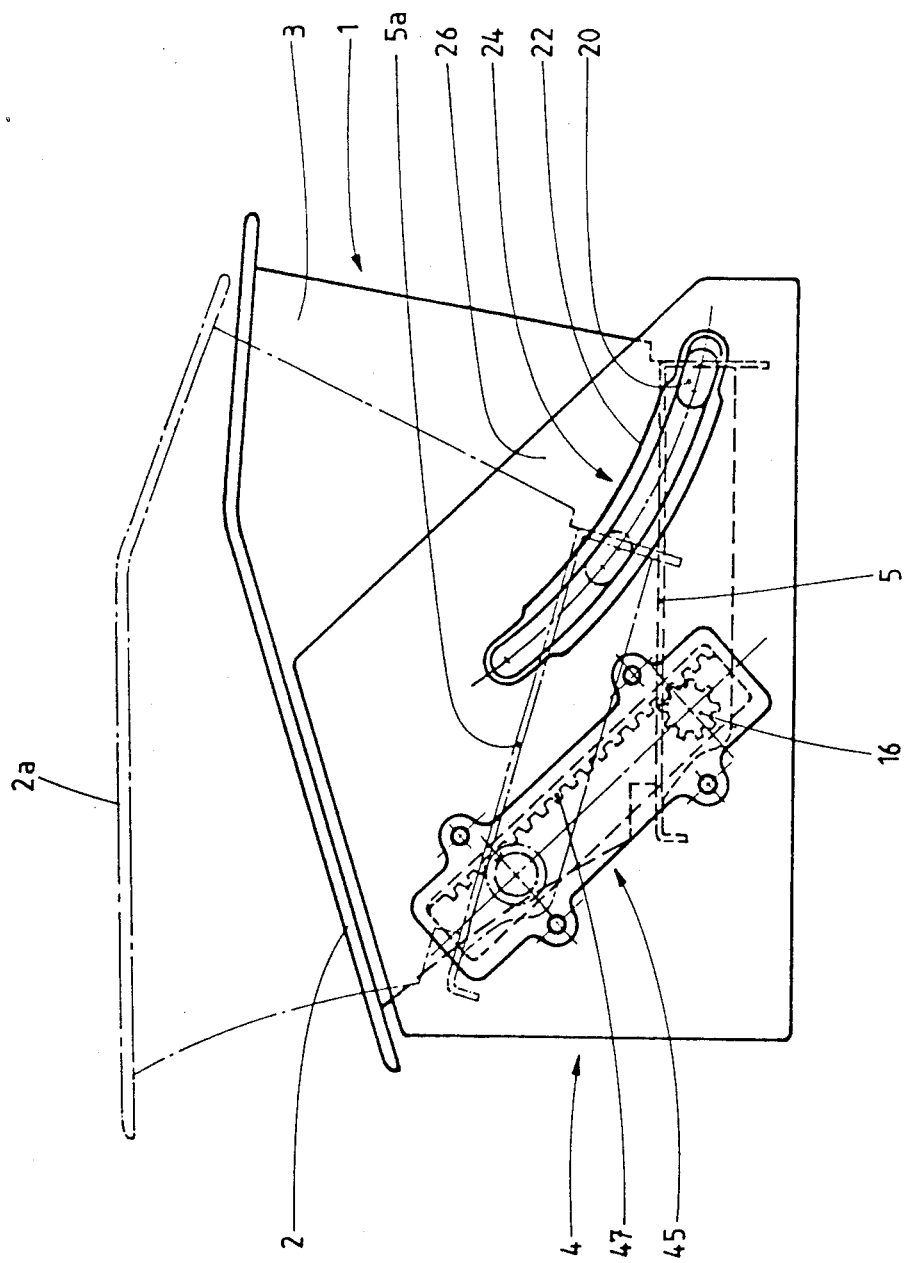
FIG. 1 is elevational side view of an arm rest according to the invention.
Figure 6:
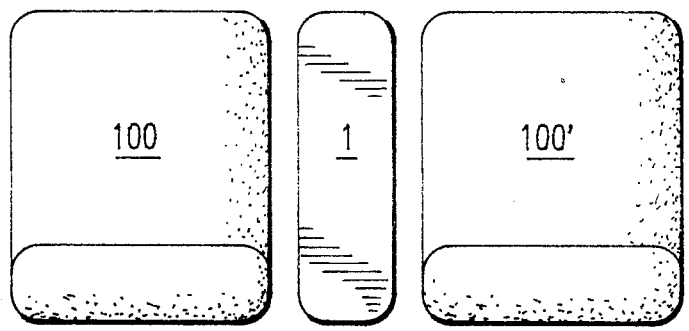
FIG. 6 is a schematic plan view of the arm rest positioned between two vehicles seats.

FIG. 1 is an elevational side view diagrammatically showing an assembly forming an arm rest according to the invention. In the illustrated example, the assembly forming the arm rest is designed to be accommodated between the two front seats 100 and 100' (FIG. 6) of a motor vehicle (not shown).

In the side view in FIG. 1, the front of the vehicle is at the left. The movable component 1 of the arm rest is shown in the down position in solid lines. Only the upholstered zone 2 forming the cover of a tidy bin 3 is above the fixed frame 4 in which the movable component is almost completely retracted. The fixed frame 4, the section of which in a horizontal plane is substantially rectangular, comprises a base plate (not shown) fixed to the floor (i.e. independently of the seats) of the vehicle between the two seats by known means (also not shown) and two parallel side walls.

FIG. 1 also shows the outline in dash-dotted lines of the same movable component in its up position, with the upholstered zone 2 then being disposed at the position indicated at 2a at a level which permits it to be used as an arm rest. The movable component 1 is displaced by means of a support plate 5 which is disposed within the fixed frame 4. The outline of the support plate 5 is shown in broken lines in the substantially horizontal down position. That outline is also shown at 5a in the inclined up position.

The bottom of the tidy bin 3 is fixed to the support plate 5 in known manner which is not shown in the drawing.

Figure 2:
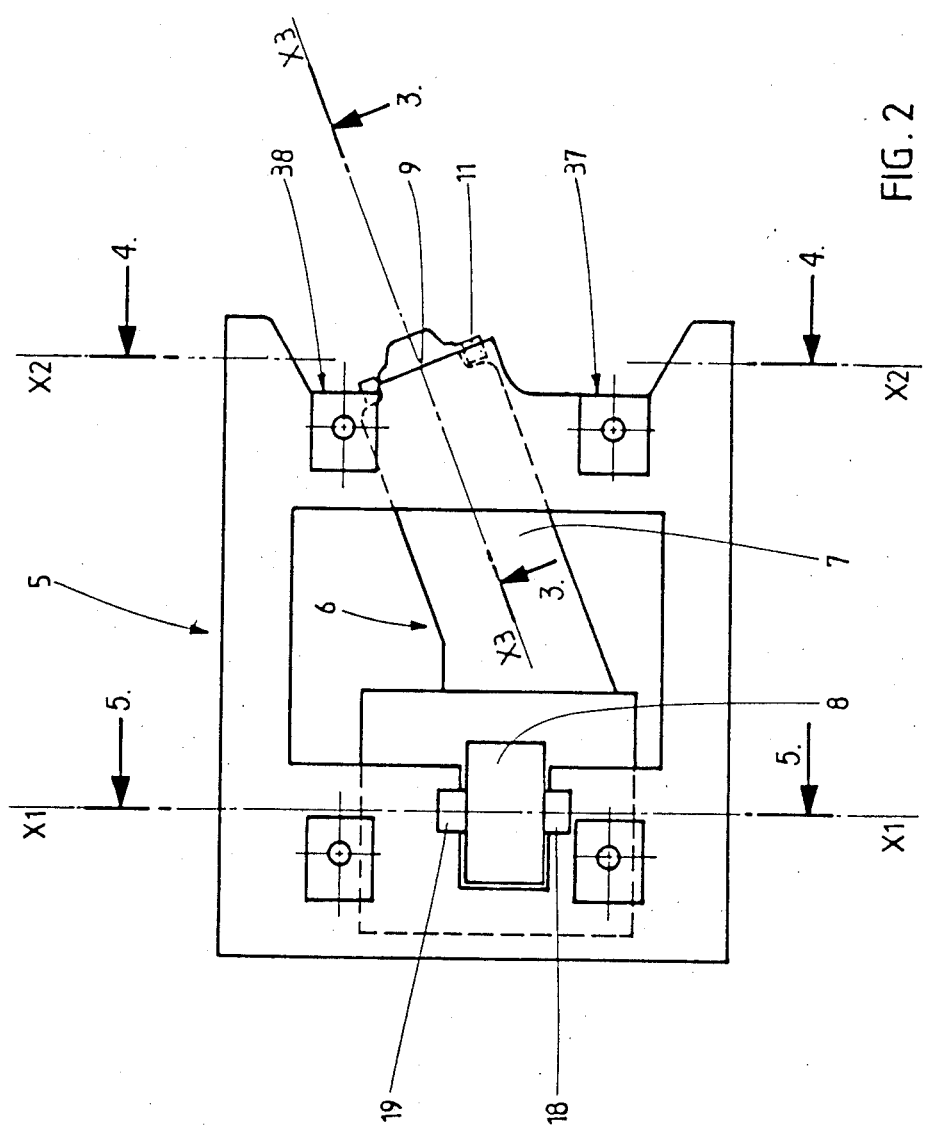
FIG. 2 is a plan view of the support plate of the movable element of shown in FIG. 1, FIG. 3 a view in section taken along line X3—X3 of the motor shown in FIG. 2.

FIG. 2 is a diagrammatic plan view of the support plate which is separated from the tidy bin 3 and also separated from the fixed frame 4. As shown in FIG. 2, a motor unit 6 of which only the outline is illustrated is fixed beneath the support plate 5. It comprises an electric motor 7 which by way of a reducing unit 8 drives a motor shaft of which only the axis is shown at X1—X1. The motor shaft is at the front of the support plate 5, that is to say on the side thereof which is oriented towards the front of the vehicle. Disposed at the rear of the support plate 5 are two support means of which only the axis X2—X2 is shown.

Figure 3:
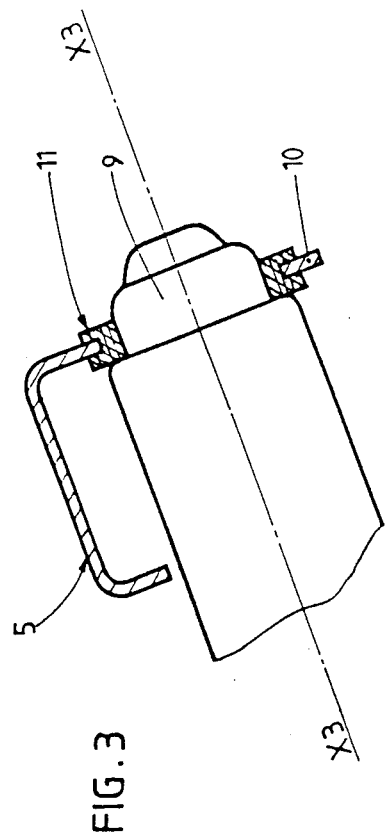
Figure 4:
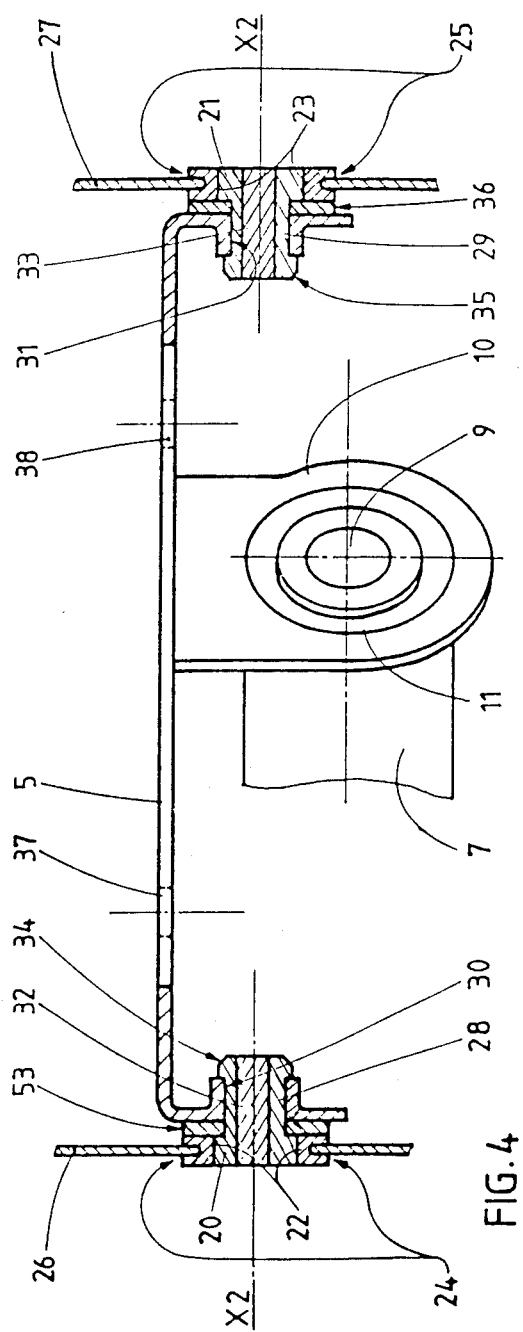
FIG. 4 is a view in section taken along section line X2—X2 in FIG. 2.

The motor unit 6 is fixed with respect to the support plate 5 at three points. The end of the electric motor 7 is engaged in a metal collar 10 (see FIGS. 3 and 4) which is fixed to the rearward end of the support plate 5. As shown in FIG. 3, an elastomer ring 11 lines the inward edge of the collar 10 and provides a clamping effect on the housing of the motor. At the front of the support plate the motor unit is supported by steel bearings 12 and 13 (see FIG. 5) within which are engaged the ends 39 and 40 of the motor shaft which is driven by the reducing unit 8. The motor shaft is of a square section and is supported on the bearings 12 and 13 by way of the rotationally symmetrical surfaces of the extension portions 14 and 15 of the toothed pinions 16 and 17, said ends 39 and 40 being accommodated within said extension portions 14 and 15.

Damper blocks 18 and 19 of elastomer material are fixed on the metal floor of the support plate 5, bearing against the upper end of the housing of the reducing unit 8 on respective sides thereof in order to prevent vibration.

The support means of the support plate 5 co-operate with the guide means of the fixed frame 4 in the manner described hereinafter. At the rear of the support plate 5 (see FIGS. 1 and 4) the two second support means which are disposed on the axis X2—X2 are sliding shoes 20 and 21 of plastics material, the external configuration of which is oval (see FIG. 1, reference 20). The shoes 20 and 21 bear slidably against the linings 22 and 23 of plastics material which cover the edges of the curved guide ramps 24 and 25 (second guide means) which are cut out in the steel plate side walls 26 and 27 of the fixed frame 4. The shoes 20 and 21 comprise an extension portion 28, 29 of circular section which engages into respective bearing members 30 and 31 formed in the side edges of the support plate 5.

Axial pins 32 and 33 which are introduced after engagement of the extension portions 28 and 29 into the bearing members 30 and 31 move the retaining tongues as indicated at 34 and 35 apart so as to hold the extension portions in position in the bearing members, while permitting a rotary movement of limited amplitude of the shoes, which is necessary for them to follow the curvature of the guide ramps 24 and 25.

Washers 53 and 36 of suitable thickness are inserted between the side edges of the support plate 5 and the linings 22 and 23 so as to take up the clearances involved and to facilitate sliding movement. The drawing also clearly shows the location of the two rearward fixing means 37 and 38 for fixing the tidy bin 3 to the support plate 5.

Figure 5:
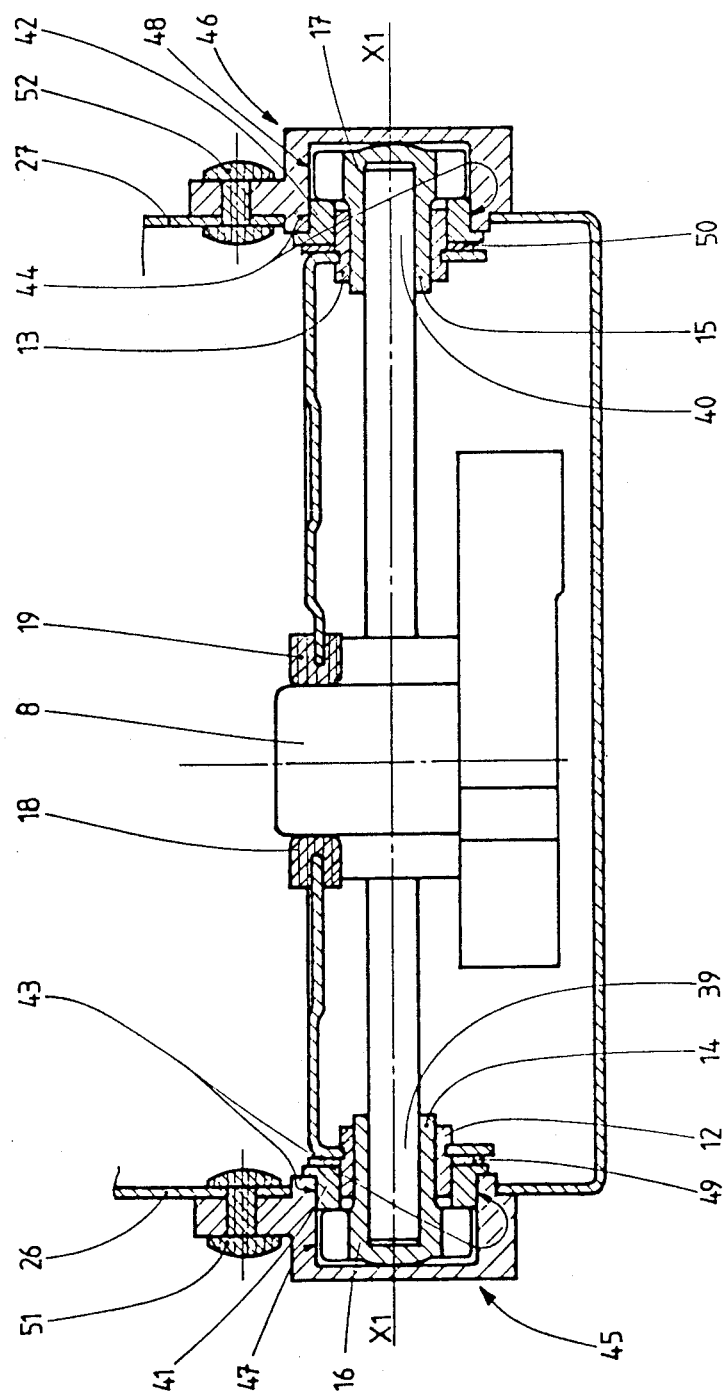
FIG. 5 is a view in section taken along section line X1—X1 in FIG. 2.

FIG. 5 shows the particular structure of the support means which are disposed at the front of the support plate 5 on the same axis X1—X1 as the drive shaft, as well as the embodiment of the means for producing displacement of the assembly, using a pinion and a rack.

The two ends 39 and 40 of square section of the drive shaft which is actuated by the reducing unit 8 are engaged into corresponding openings provided in the extension portions 14 and 15 of the toothed pinions 16 and 17 of plastics material. The extension portions 14 and 15 are mounted for rotary movement as described hereinbefore, on the steel bearing members 12 and 13 fixed in openings provided in the side edges of the support plate 5.

The external rotationally symmetrical walls of the bearing members 12 and 13 form the front or first support means for the support plate 5, by way of rings 41 and 42 of plastics material which are supported on the upper and lower inward edges 43 and 44 of the guide members 45 and 46 (first guide means) of plastics material, the inward edges forming two straight guide ramps.

The guide members 45 and 46 also comprise racks 47 and 48 (see FIG. 1, the rack 47 shown in broken lines), which are disposed in parallel relationship to the upper edge of each of the guide ramps 43 and 44. The pinions 16 and 17 mesh with the racks in the manner shown in FIG. 1. Washers 49 and 50 disposed around the bearing members 12 and 13 between the rings 41 and 42 and the side edges of the support plate 5 facilitate rotary movement of the rings and provide for compensation of clearances. The guide members 45 and 46 are engaged by way of their edges in openings in the side walls 26 and 27 of the fixed frame 4 and are fixed with respect to the side walls 26 and 27 by rivets of plastics material as indicated at 51 and 52.

By imparting a suitable angle of inclination to the guide members 45 and 46 so that the ramps 43 and 44 are inclined at an angle of between 20° and 80° and preferably between 30° and 70° and so that the guide ramps 24 and 25 present the desired inclination and curvature, it is possible to provide for the arm rest a down position which minimises the amount of space taken up between the two front seats of the vehicle. That down position is generally very substantially rearwardly with respect to the up position, with the front part of the upholstered zone 2 then being considerably inclined towards the floor of the vehicle.

In contrast, in the up position, the front part of the upholstered zone 2 is raised further so as to approach the horizontal.

Those results are attained by varying the angle between the support plate and the horizontal in the course of its movement between the up and down positions, by virtue of the guide ramps.

Different plastics materials may be used to produce the components of the arm rest. It is possible for example to use polyamides. Fillers such as molybdenum disulphide may be added to the plastics materials, to improve the coefficient of sliding movement. It is also possible to reinforce those plastics materials by means of fibres such as glass fibres, carbon fibres or the like.

The use of a reducing unit with a high degree of reduction, for example a reduction ratio of 1/20 to 1/100, makes it possible to use low-power motors and readily to achieve irreversibility which is generally desirable.

Known travel-limiting devices (not shown) cause the motor to be stopped when the arm rest reaches the up or down positions. The motor which is powered in known manner by alternating or direct current is remotely controlled by at least one occupant of a seat by virtue of a start-stop control means with change-over switch, which permits the arrangement to be stopped in any position of the movable element of the arm rest within the range of adjustment thereof.

We claim:

1. A movable arm rest positioned adjacent at least one seat of a vehicle, comprising:
   a fixed frame stationarily positioned in a vehicle adjacent a seat and independently of the seat thereof;
   a movable component having an upper part forming an arm support surface;
   means for mounting said movable component on said fixed frame for movement independent of said seat between an up position in which said support surface is positioned to support an arm of an occupant of the seat, and a down position in which said support surface is retracted downward with respect to the up position, wherein said means for mounting comprise:
   (a) support means mounted to said movable component, and
   (b) guide means in said fixed frame, said guide means being inclined with respect to the horizontal direction and said guide means guiding said support means during movement of said movable component between said up and down positions; and
   motor means fixed with respect to the movable component for continuously moving said movable component between said up and down positions,
   whereby said arm rest may be adjusted to a use position between said up position and said down position.

2. The movable arm rest of claim 1 wherein said support means comprise first and second support means and wherein said guide means comprise first and second guide ramps inclined at different angles with respect to the horizontal for guiding said support means such that said support surface is moved parallel to a substantially horizontal axis during movement of said movable component.

3. The movable arm rest of claim 2 wherein said horizontally inclined first guide ramp comprises a straight guide ramp inclined from the horizontal by an angle of between 20° and 80°.

4. The movable arm rest of claim 3 wherein said angle is between 30° and 70°.

5. The movable arm rest of claim 2 wherein said first guide means further comprise a rack on said first guide ramp, and wherein said motor means comprise a motor having a driven pinion meshing with said rack.

6. The movable arm rest of claim 5 wherein said second guide means comprise horizontally inclined, curved guide ramps.

7. The movable arm rest of claim 5 including a support plate fixed to said movable component, wherein said first and second support means and said motor are mounted to said support plate.

8. The movable arm rest of claim 5 including a speed reduction unit between said motor means and said pinion.

9. The movable arm rest of claim 2 wherein said second guide means comprise horizontally inclined, curved guide ramps.

10. The movable arm rest of claim 9 including a support plate fixed to said movable component, wherein said first and second support means and said motor are mounted to said support plate.

11. The movable arm rest of claim 10 wherein said first and second support means comprise sliding supports at opposite ends of support plate and sliding in said guide ramps.

12. The movable arm rest of claim 11 wherein said guide ramps are lined with a polymide plastic material.

13. The movable arm rest of claim 12 wherein said plastic includes a low friction molybdenum disulphide filler.

* * * * *